(12) United States Patent
Kumar

(10) Patent No.: US 8,224,710 B2
(45) Date of Patent: Jul. 17, 2012

(54) METHOD AND SYSTEM FOR BIDDING ON MULTIPLE AUCTIONS

(75) Inventor: Suresh Kumar, Bellevue, WA (US)

(73) Assignee: Amazon.com, Inc., Seattle, WA (US)

( * ) Notice: Subject to any disclaimer, the term of this patent is extended or adjusted under 35 U.S.C. 154(b) by 0 days.

(21) Appl. No.: 13/100,574

(22) Filed: May 4, 2011

(65) Prior Publication Data

US 2011/0208608 A1  Aug. 25, 2011

Related U.S. Application Data

(63) Continuation of application No. 09/531,703, filed on Mar. 20, 2000, now Pat. No. 7,958,009.

(51) Int. Cl.
  *G06Q 40/00* (2006.01)
(52) U.S. Cl. ......................... 705/26.3; 705/30
(58) Field of Classification Search ............... 705/10–44
  See application file for complete search history.

(56) References Cited

U.S. PATENT DOCUMENTS

| | | | | |
|---|---|---|---|---|
| 5,689,652 A | * | 11/1997 | Lupien et al. | 705/37 |
| 5,727,165 A | * | 3/1998 | Ordish et al. | 705/37 |
| 5,905,975 A | * | 5/1999 | Ausubel | 705/37 |
| 6,006,194 A | * | 12/1999 | Merel | 705/7.26 |
| 6,021,398 A | * | 2/2000 | Ausubel | 705/37 |
| 6,078,906 A | * | 6/2000 | Huberman | 705/37 |
| 6,415,270 B1 | * | 7/2002 | Rackson et al. | 705/36 R |
| 6,519,570 B1 | * | 2/2003 | Faber et al. | 705/7.12 |
| 7,177,832 B1 | * | 2/2007 | Semret et al. | 705/37 |
| 7,676,034 B1 | * | 3/2010 | Wu et al. | 379/265.01 |

* cited by examiner

*Primary Examiner* — Frantzy Poinvil
(74) *Attorney, Agent, or Firm* — Fenwick & West LLP

(57) ABSTRACT

A method and system for bidding on multiple auctions. The multiple auction bidding system allows a user to define various models for bidding at multiple auctions. The bidding system then automatically places bids on behalf of the user. The bidding rules may specify to win at most one of multiple auctions at the lowest price or to bid at an auction only if successful at bidding at another auction.

22 Claims, 15 Drawing Sheets

METHOD AND SYSTEM FOR BIDDING ON MULTIPLE AUCTIONS

RELATED APPLICATIONS

This application is a continuation of U.S. application Ser. No. 09/531,703, filed on Mar. 20, 2000, the entire teachings of which, including any attachments or appendices thereof, are hereby incorporated by reference herein for all purposes.

TECHNICAL FIELD

The present invention relates generally to conducting electronic commerce, and more particularly to conducting auctions via computer network.

BACKGROUND

Because it facilitates electronic communications between vendors and purchasers, the Internet is increasingly being used to conduct "electronic commerce." The Internet comprises a vast number of computers and computer networks that are interconnected through communication channels. Electronic commerce refers generally to commercial transactions that are at least partially conducted using the computer systems of the parties to the transactions. For example, a purchaser can use a personal computer to connect via the Internet to a vendor's computer. The purchaser can then interact with the vendor's computer to conduct the transaction. Although many of the commercial transactions that are performed today could be performed via electronic commerce, the acceptance and wide-spread use of electronic commerce depends, in large part, upon the ease-of-use of conducting such electronic commerce. If electronic commerce can be easily conducted, then even the novice computer user will choose to engage in electronic commerce. Therefore, it is important that techniques be developed to facilitate conducting electronic commerce.

The Internet facilitates conducting electronic commerce, in part, because it uses standardized techniques for exchanging information. Many standards have been established for exchanging information over the Internet, such as electronic mail, Gopher, and the World Wide Web ("WWW"). The WWW service allows a server computer system (i.e., web server or web site) to send graphical web pages of information to a remote client computer system. The remote client computer system can then display the web pages. Each resource (e.g., computer or web page) of the WWW is uniquely identifiable by a Uniform Resource Locator ("URL"). To view a specific web page, a client computer system specifies the URL for that web page in a request (e.g., a HyperText Transfer Protocol ("HTTP") request). The request is forwarded to the web server that supports that web page. When that web server receives the request, it sends the requested web page to the client computer system. When the client computer system receives that web page, it typically displays the web page using a browser. A browser is typically a special-purpose application program that effects the requesting of web pages and the displaying of web pages.

Currently, web pages are generally defined using HyperText Markup Language ("HTML"). HTML provides a standard set of tags that define how a web page is to be displayed. When a user indicates to the browser to display a web page, the browser sends a request to the server computer system to transfer to the client computer system an HTML document that defines the web page. When the requested HTML document is received by the client computer system, the browser displays the web page as defined by the HTML document. The HTML document contains various tags that control the displaying of text, graphics, controls, and other features. The HTML document may contain URLs of other web pages available on that server computer system or other server computer systems.

The World Wide Web portion of the Internet is especially conducive to conducting electronic commerce. Many web servers have been developed through which vendors can advertise and sell product. The products can include items (e.g., music) that are delivered electronically to the purchaser over the Internet and items (e.g., books) that are delivered through conventional distribution channels (e.g., a common carrier). A server computer system may provide an electronic version of a catalog that lists the items that are available. A user, who is a potential purchaser, may browse through the catalog using a browser and select various items that are to be purchased. When the user has completed selecting the items to be purchased, the server computer system then prompts the user for information to complete the ordering of the items. This purchaser-specific order information may include the purchaser's name, the purchaser's payment information (e.g., credit card number), and a shipping address for the order. The server computer system then typically confirms the order by sending a confirming web page to the client computer system and schedules shipment of the items.

The World Wide Web is also being used to conduct other types of commercial transactions. For example, some server computer systems have been developed to support the conducting of auctions electronically. To conduct an auction electronically, the seller of an item provides a definition of the auction via web pages to a server computer system. The definition includes a description of the item, an auction time period, and optionally a minimum bid. The server computer system then conducts the auction during the specified time period. Potential buyers can search the server computer system for an auction of interest. When such an auction is found, the potential buyer can view the bidding history for the auction and enter a bid for the item. When the auction is closed, the server computer system notifies the winning bidder and the seller (e.g., via electronic mail) so that they can complete the transaction.

Although such electronic auctions facilitate conducting of auctions, there are difficulties when the bidder wants to participate in multiple auctions. In particular, bidders may have a difficult time deciding in which auctions to participate and in following the events of the auction. For example, if similar items are being auctioned, then a bidder needs to decide in which of those auctions to participate when only one item is desired. If the bidder is outbid, the bidder may not have enough time to place a bid at that auction or another auction. The bidder may not have enough time because the auctions are near their closing time or because the bidder did not receive timely notification of being outbid. Placing bids in many auctions simultaneously puts the bidder at risk of winning more than one item. Some auction systems allow a bidder to specify a maximum bid at an auction and then continually place bids on behalf of the bidder until the maximum bid is reached. While the use of such a maximum bid helps solve a problem of being outbid at an auction, it does not address the other problems of multiple auctions. It would be desirable to have an automatic bidding system that would help solve these difficulties.

DETAILED DESCRIPTION

A method and system for bidding on multiple auctions conducted through a computer network is provided. In one embodiment, the bidding system allows a bidder to direct automatic bidding at multiple auctions in accordance with bidding techniques that are specified by the bidder. To direct the automatic bidding, the bidding system allows the bidder to specify the auctions at which the bids may be placed. The bidding system also allows the bidder to specify the bidding technique that should be used when bidding at the specified auctions on the bidder's behalf. For example, one bidding technique may be to evaluate auctions for similar items and to place a bid at the auction with the lowest current bid whenever the last bid is outbid. Another bidding technique may be to bid at an auction only after winning another auction. Once the auctions are specified and the bidding technique is specified, the bidding system participates in the auctions in accordance with the specified bidding technique. In this way, the bidder can be assured that bids are being placed at multiple auctions in accordance with their desires without having to personally monitor and participate in the auctions.

In one embodiment, the bidding system operates as a frontend to existing auction systems. The bidding system inputs from a bidder the bidding specifications that specify how the bidder wants to bid at multiple auctions. The bidding system then acts as a bidding agent to place bids on behalf of the bidder in accordance with the bidding specifications. In this way, existing auction systems do not need to be modified to accommodate the bidding system.

In one embodiment, the bidding system allows a bidder to specify various combinations of bidding techniques that are to be applied to the multiple auctions. For example, the bidding system may allow the bidder to specify a desire to bid on two auctions for similar items in such a way that only one auction is won at the lowest price possible. The bidding system may also allow the bidder to specify that, if one of those auctions is won, then the bidding system should participate in another auction on behalf of the bidder. For example, the bidder may want to bid at multiple auctions for certain type of camera and win at most one camera. The bidder may then want to bid at an auction for a lens only if successful at one of the camera auctions.

Figure 1:
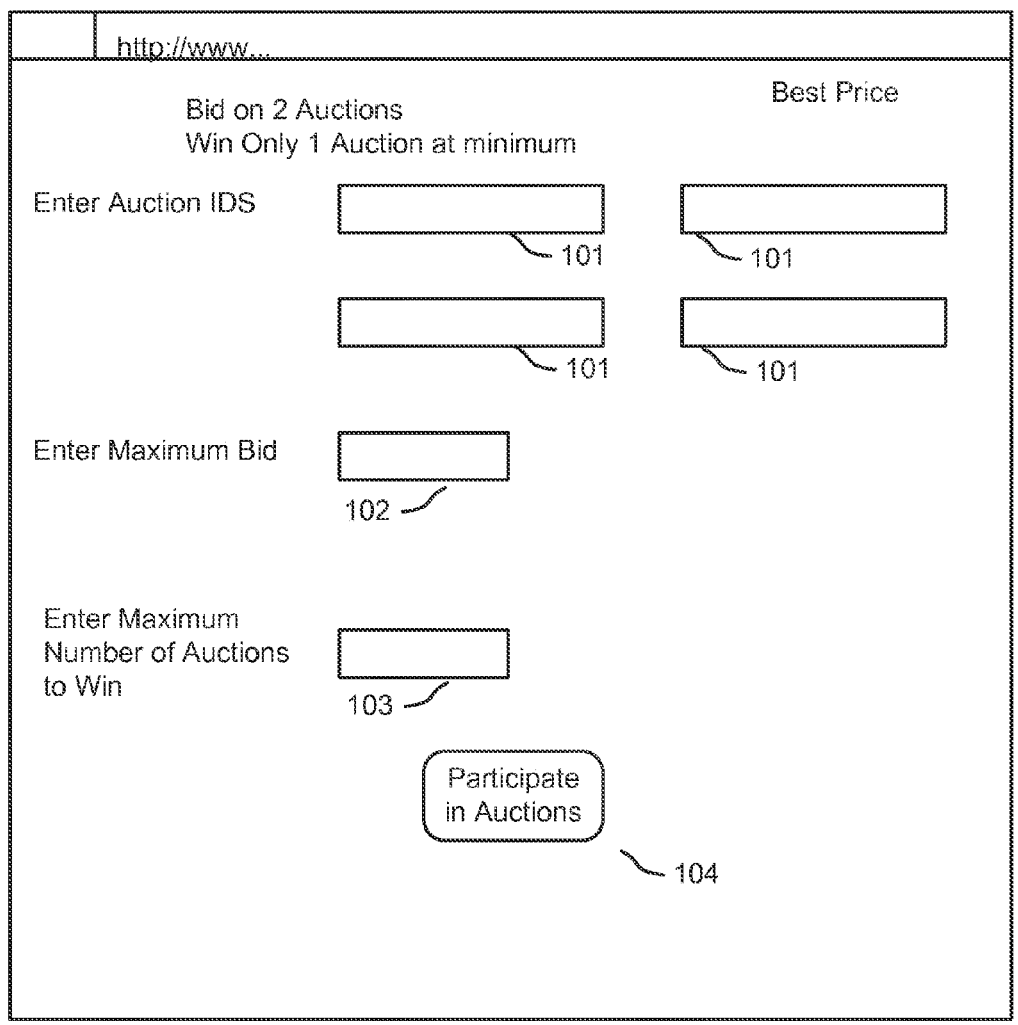
FIG. 1 illustrates a sample web page of the bidding system for specifying a best price bidding technique for multiple auctions.

FIG. 1 illustrates a sample web page of the bidding system for specifying a best price bidding technique for multiple auctions. A "best price" bidding technique is one in which there are multiple auctions for similar items (or at least items that the bidder considers fungible), and the bidder wants to win only a certain number of auctions at the lowest prices possible. Web page 100 includes auction ID fields 101, maximum bid field 102, maximum number of auctions to win field 103, and participate-in-auctions button 104. The auction ID fields allow a bidder to input the identifiers of the auctions. Each auction may have an associated unique identifier assigned by an auction system. A bidder may browse through a hierarchy of auction categories to identify the auctions of interest. The bidding system may display a dialog box for browsing through the categories of auctions when an auction ID fields is selected. The maximum bid field is for input of the maximum bid for these auctions. The maximum number of auctions to win field is for input of two maximum numbers of auctions the bidder wants to win. When a bidder selects the participate-in-auctions button, the bidding system stores the multiple auction bidding information (e.g., identification of the auctions and an indication of the bidding technique) and may provide a confirmation identifier to the bidder. The bidding system uses the best price bidding technique when bidding at the identified auctions. According to the best price bidding technique, the bidding system will initially determine the current bid of each auction and then place a bid at the (maximum number of) auctions whose current bids are lowest. Whenever a bid placed by the bidding system is outbid, the bidding system will again determine the current bid of each auction for which no bid of the bidder is pending and then place a bid at the auction whose current bid is lowest. The bidding system will stop bidding when the maximum number of auctions won or when each auction has a bid that exceeds the maximum bid. The bidding system will have at most the maximum number of bids pending at any time to ensure that the bidder will win at most the maximum number of items. Since it is possible that the bidding bidder will be outbid at both auctions, the bidding system can only guarantee an upper bound on the number of items won. In this example, a bidder may identify four auctions and indicate that the bidder wants to win at two of the auctions. In such an example, the bidding system will have bids pending at most two auctions with the lowest current bids.

Figure 2:
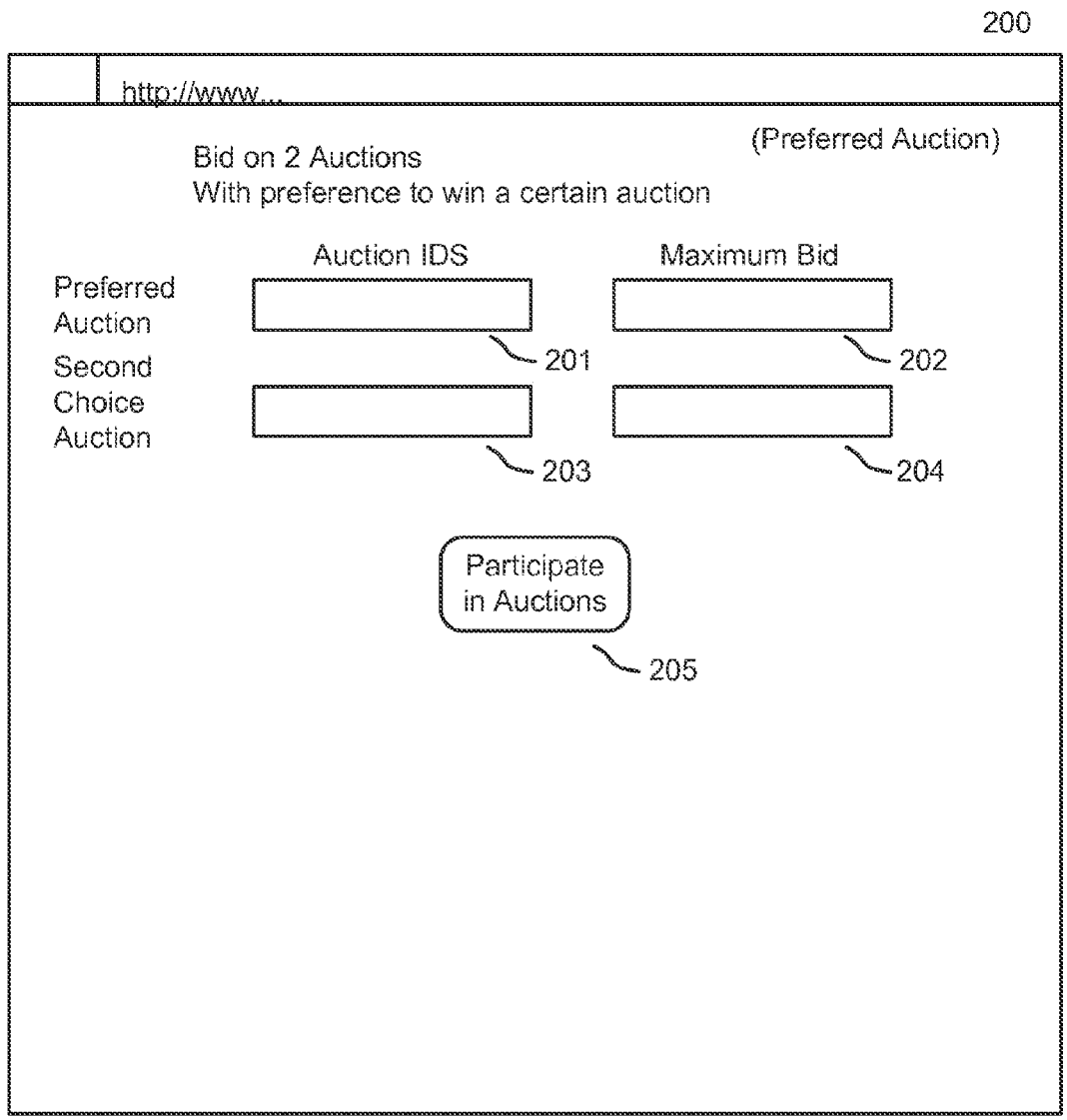
FIG. 2 illustrates a sample web page of the bidding system for specifying a preferred bidding technique for multiple auctions.

FIG. 2 illustrates a sample web page of the bidding system for specifying a preferred bidding technique for multiple auctions. A "preferred" auction bidding technique is one in which there are multiple auctions for similar items, and the bidder has a preference for winning certain auctions over other auctions and only wants to win a certain number of the auctions. Web page 200 includes auction ID fields 201 and 202, maximum bid fields 203 and 204, and participate-in-auctions button 205. The bidder enters the identifier of the preferred auction in auction ID field 201 and the identifier of the second preferred auction in auction ID field 202. The bidder enters the maximum bid for the preferred auction in maximum bid field 203 and for the second preferred auction in maximum bid field 204. When the bidder selects the participate-in-auctions button, the bidding system stores the multiple auction bidding information and may provide a confirmation identifier to the bidder. The bidding system uses the preferred auction bidding technique when bidding at the identified auctions. According to the preferred auction bidding technique, the bidding system will initially bid at the preferred auction until the maximum price is exceeded or until the auction is won. If the maximum price is exceeded, then the bidding system will start bidding at the second preferred auction. More generally, the bidding system may allow for more than two auctions to be identified and more than one auction to be won. For example, a bidder may identify five auctions in a preferred order and indicate that the bidder wants to win at two of the auctions. In such a case, the bidding system will have bids pending on two auctions.

Figure 3:
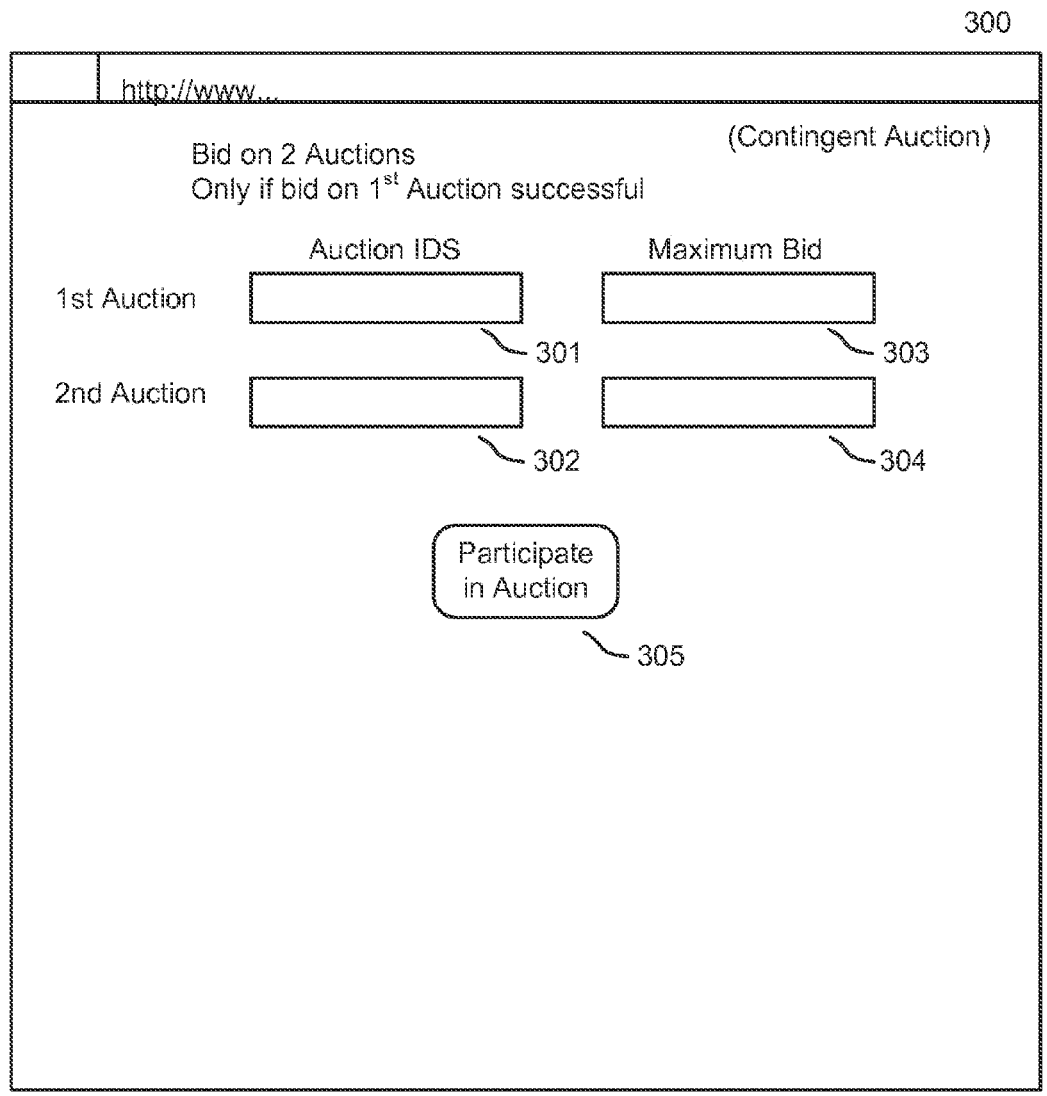
FIG. 3 illustrates a sample web page of the bidding system for specifying a contingent bidding technique for multiple auctions.

FIG. 3 illustrates a sample web page of the bidding system for specifying a contingent bidding technique for multiple auctions. A "contingent" bidding technique is one in which there are multiple auctions, and the bidder wants to bid at one auction only when another auction is won. Web page 300 includes auction ID fields 301 and 302, maximum bid fields 303 and 304, and participate-in-auctions button 305. The bidder enters the identifier of the contingent-on auction in auction ID fields 301 and the maximum bid in maximum bid field 303. The bidder enters the identifier of the contingent auction in auction ID field 302 and the maximum bid in maximum bid field 304. When the bidder selects the participate-in-auctions button, the bidding system stores the multiple auction bidding information and may provide a confirmation identifier to the bidder. The bidding system uses the contingent bidding technique when bidding at the identified auctions. According to the contingent bidding technique, the bidding system will initially bid on the contingent-on auction until the maximum price is exceeded or until the auction is won. If the contingent-on auction is won, the bidding system will start bidding at the contingent auction. More generally, the bidding system may allow for more than two auctions to be identified as being contingent-on auctions and more than one contingent auction to be won. For example, a bidder may identify three auctions as contingent-on auctions and specify that if two of those auctions are won, then to bid at two contingent auctions.

One skilled in the art would appreciate that various combinations of the bidding techniques can be specified when bidding on multiple auctions. For example, a bidder may want to bid at auctions using a preferred auction bidding technique and contingent upon winning one of those auctions, bid at other auctions using a best price bidding technique. Such a combination of bidding techniques may be appropriate when, for example, the bidder wants to buy a certain type of camera and there are several auctions for models of that camera with slightly different features and then buy a compatible lens and there are several auctions for equivalent lens.

Figure 4:
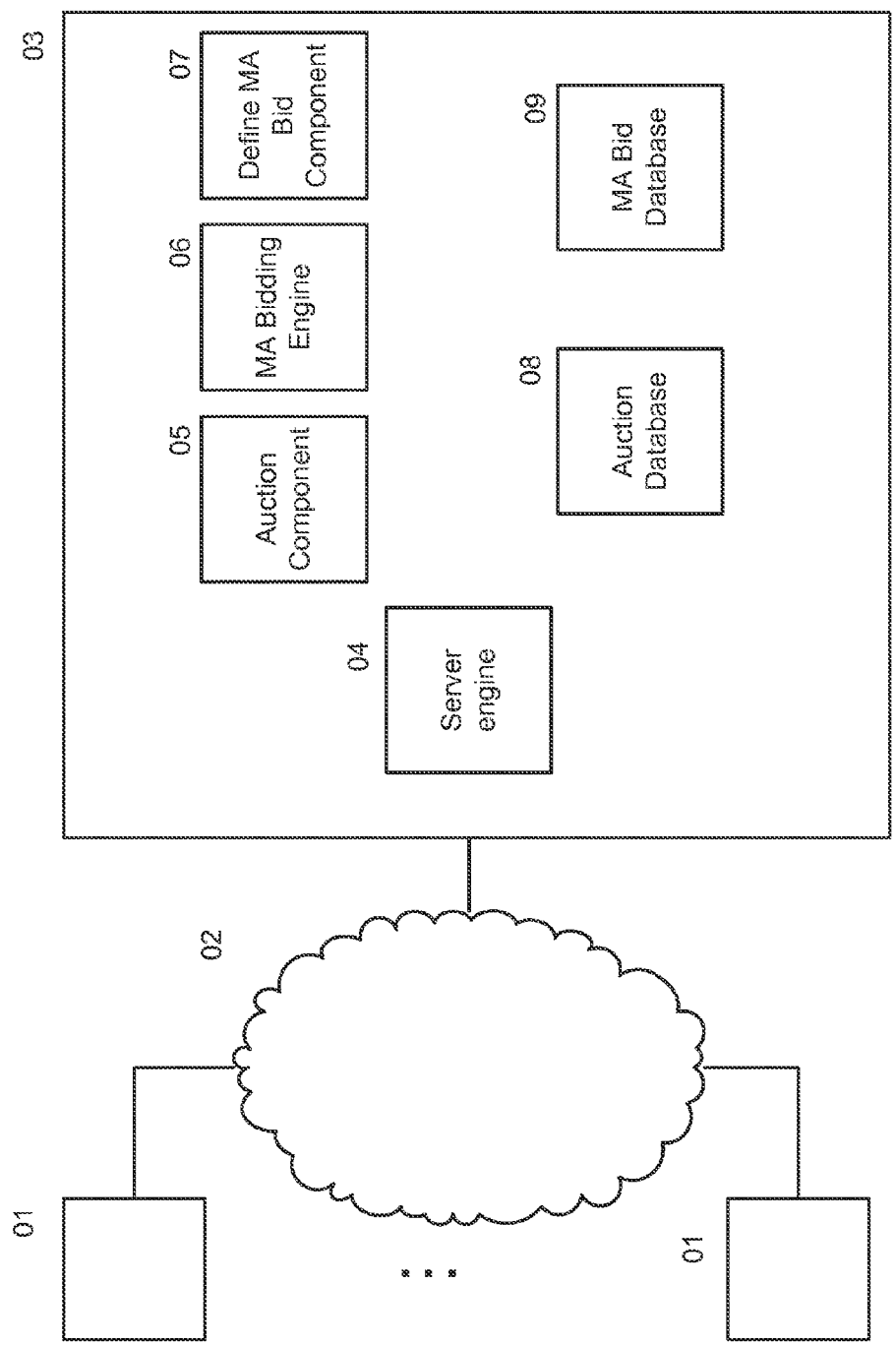
FIG. 4 is a block diagram illustrating the components of a multiple auction ("MA") system in one embodiment.

FIG. 4 is a block diagram illustrating the components of a multiple auction ("MA") system in one embodiment. The client computers 401 and the server computer 403 are interconnected via the Internet 402. The computers may include a central processing unit, memory, input devices (e.g., keyboard and pointing device), output devices (e.g., display devices), and storage devices (e.g., disk drives). The memory and the storage devices are computer-readable media that may contain computer instructions that implement the bidding system. The computer-readable media may also include computer data transmission media, such as wire-based or wireless communications mechanisms. The client computers use a browser to access various web pages via the Internet, such as the web pages described above. The server computer implements the bidding system. The server system includes a server engine 702, an auction component 405, an MA bidding engine 406, a define MA bid component 407, an auction database 408, and MA bid database 409. The server engine receives requests for resources (e.g., web pages) via the Internet and coordinates the generation and transmission of the resources. The auction component may control the creating, the bidding, and the closing of auctions in a conventional manner. The auction database contain information in describing the auctions. The define MA bid component controls the input of multiple auction bidding specifications through web pages such as those illustrated by FIGS. 1-3. The multiple auction bidding specifications are stored in the MA bid database. The MA bidding component places bids with the auction component in accordance with the information stored in the MA bid database.

One skilled in the art will appreciate that the concepts of the bidding system can be used in various environments other than the Internet. The MA bidding system can operate independently of the auction system or systems. For example, the MA bidding system can place bids on auctions conducted at various auction sites. The MA bidding system can be implemented as a web site whose primary function is to control bidding at auctions conducted by various other web sites. Also, the MA bidding engine, the define MA bid component, and the MA bid database may be implemented as client-side components. Also, the concepts can also be used in an electronic mail environment in which electronic mail messages may describe an auction. Also, various communication channels may be used such as a local area network, wide area network, or a point-to-point dial-up connection instead of the Internet. The auctions may also be conducted within a single computer environment, rather than in a client/server environment. Also, a server system may comprise any combination of hardware or software that can support these concepts. In particular, a web server may actually include multiple computers. A client system may comprise any combination of hardware or software that interact with the server system. These client systems may include television-based systems and various other consumer products through which auctions can be conducted.

Figure 5:
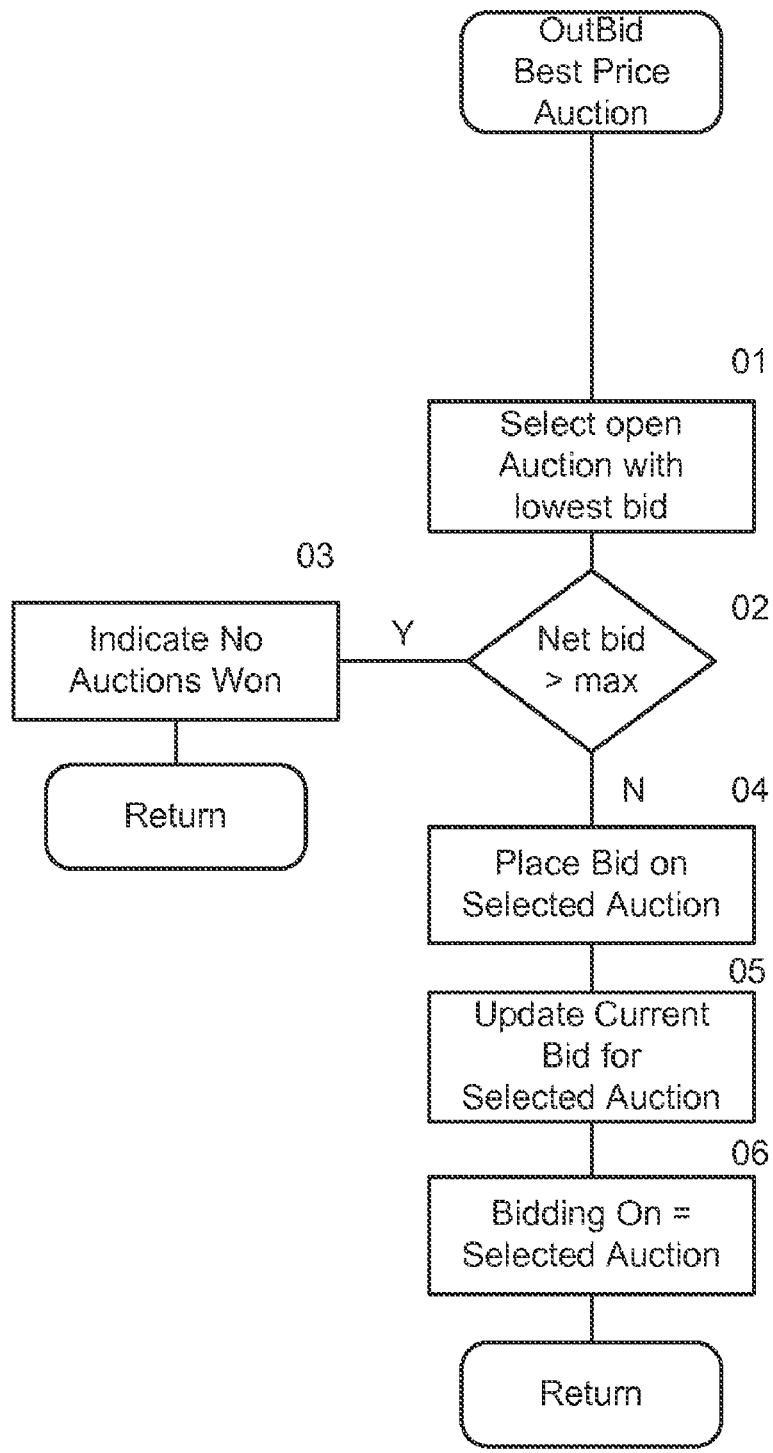
FIG. 5 is a flow diagram illustrating sample processing when a new bid message is received for an auction that is the subject of the best price bidding technique.

FIGS. 5-8 are flow diagrams illustrating the processing of certain auction events by the MA bidding engine. An auction can be modeled by the data that it receives and that it provides. For example, an auction receives data indicating to place a bid and sends an event to notify a bidder being outbid. The events include an indication of being outbid at the current auction and an indication that the current auction has been won. The "current" auction is the auction at which the bidding system currently has a bid placed. FIG. 5 is a flow diagram illustrating sample processing when an outbid message is received for an auction that is the subject of the best price bidding technique. This routine places a bid with a user-specified auction that has the lowest current bid, assuming the bid is less than the maximum bid. The routine is invoked when the message is received. In block 501, the routine selects an open auction with the lowest bid. In decision block 502, if the next bid would exceed the maximum bid, then the routine continues at block 503, else the routine continues at block 504. In block 503, the routine indicates that no auction has been won and returns. In block 504, the routine places a bid at the selected auction. In block 505, the routine updates the current bid for the selected auction. In block 506, the routine sets a bidding on flag to indicate that the bidding system is currently bidding on the selected auction and then returns.

Figure 6:
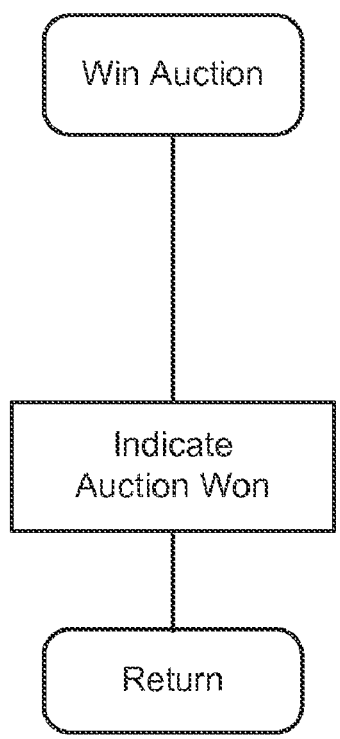
FIG. 6 is a flow diagram illustrating sample processing when a win auction event is received.

FIG. 6 is a flow diagram illustrating sample processing when a win auction event is received. In block 601, the routine indicates that the current auction has been won for the current bid and then returns.

Figure 7:
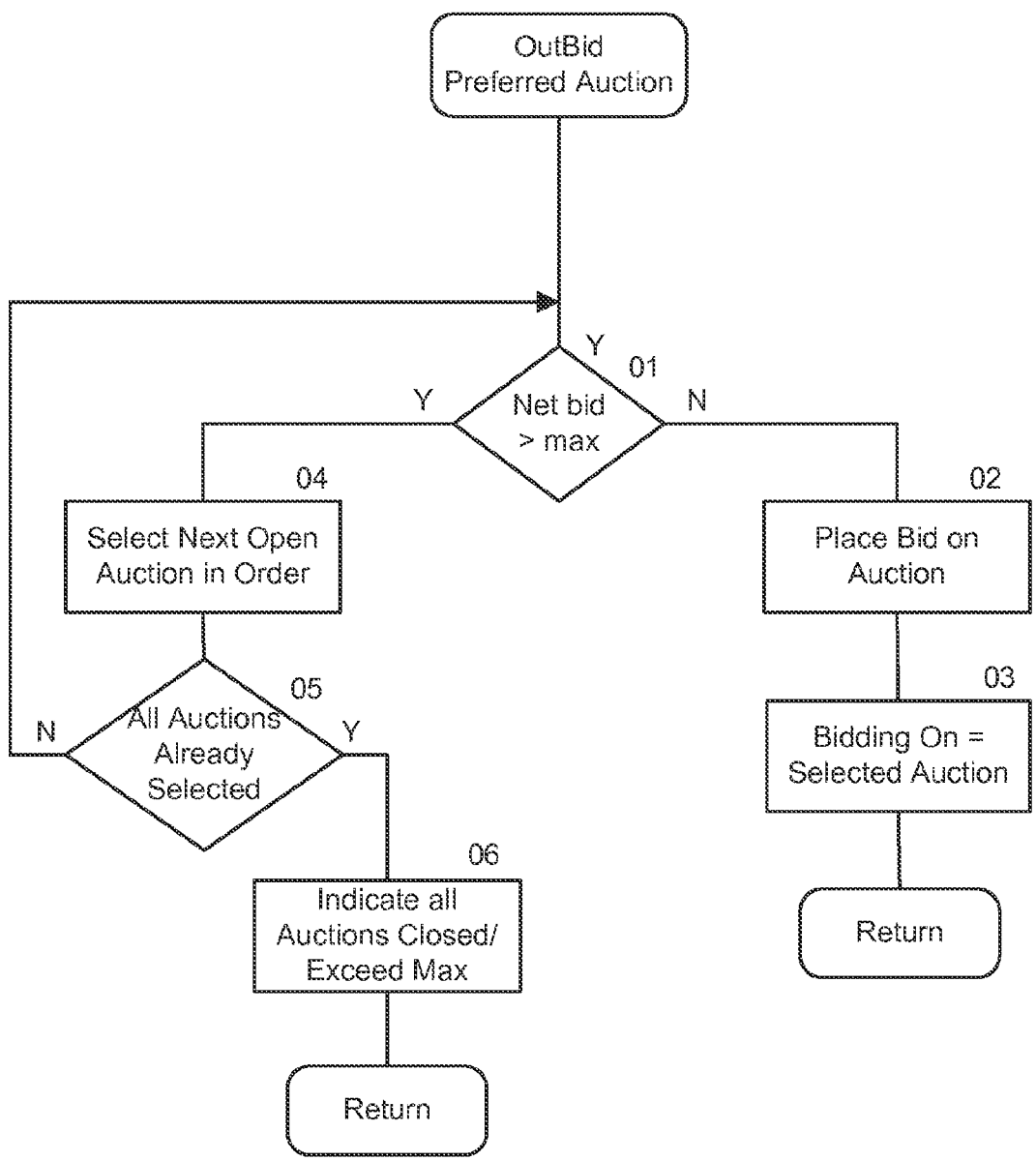
FIG. 7 is a flow diagram illustrating sample processing when an outbid event is received for an auction that is the subject of the preferred by the bidding technique.

FIG. 7 is a flow diagram illustrating sample processing when an outbid event is received for an auction that is the subject of the preferred auction bidding technique. The routine initially selects the current auction. In decision block 701, if the next bid at the selected auction would be greater than the maximum bid, then the routine continues at block 702, else the routine continues at block 704. In block 702, the routine places a bid at the selected auction. In block 703, the routine indicates that the bidding system is bidding at the selected auction and then returns. In block 704, the routine selects the next open auction in the preferred order. In decision block 705, if all the auctions have already been selected, then all the auctions are closed or their maximums are exceeded and the routine continues at step 706, else the routine loops to block 701 to determine whether the bid would be exceeded. In block 706, the routine indicates that all auctions are closed or their maximums have been exceeded and then returns.

Figure 8:
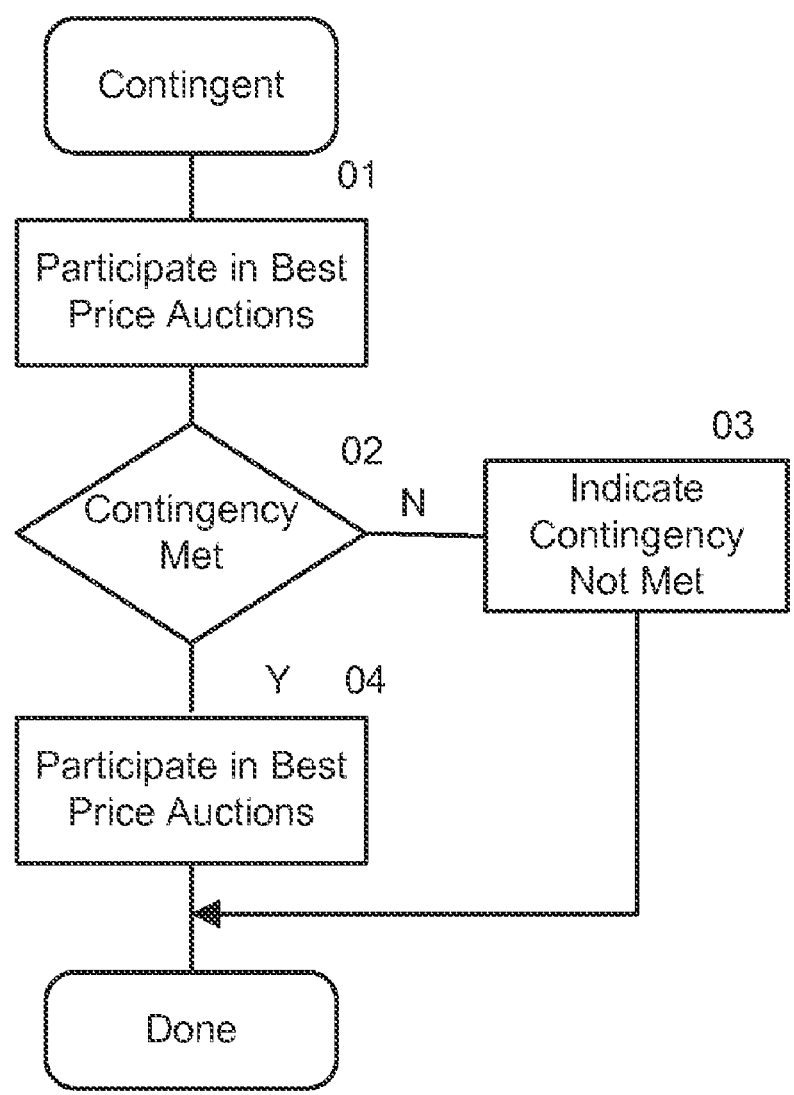
FIG. 8 is a flow diagram illustrating sample processing when an outbid event is received and the auction is the subject of the contingent bidding technique.

FIG. 8 is a flow diagram illustrating sample processing when an outbid event is received and the auction is the subject of the contingent bidding technique. In block 801, the routine indicates to participate in the contingent-on auctions using a best price bidding technique. In decision block 802, if the contingency is met, then the routine continues at block 804, else the routine continues at block 803. In block 803, the routine indicates that the contingency has not been met and then returns. In block 804, the routine participates in the contingent auctions using the best price bidding technique and then returns.

In one embodiment, the bidding system implements a bidding plan using agents. Each agent may be a C++-type object and may implement a bidding technique for directly bidding at one or two auctions. (The agent could be developed to directly control more than two auctions. Alternatively, more than two auctions can be controlled by indirectly allowing one agent to control multiple agents.) For example, a best price agent applies the best price bidding technique to two auctions. The bidding system defines the interface supported by both auction agents and bidding agents. By use of the interface, an agent can be notified of auction events and can place bids at auctions. The interface provides outbid, win, and lost auction functions for receiving auction events and provides place bid and get bid functions for placing bids and retrieving the current bid. An auction agent provides an interface to an auction, and a bidding agent provides an interface for implementing a bidding technique. Each bidding agent provides an implementation of the interface that is appropriate to its bidding technique. For example, when a best price bidding agent receives notification that its current bid has been outbid (by invocation of the outbid function), then the bidding agent can place a bid at the auction with lowest current bid. A bidding agent provides the same interface as an auction agent and is considered to represent a pseudo-auction. A bidding agent may place bids at (control) two auctions that may be real (represented by an auction agent) or pseudo-auctions (represented by another bidding agent). The bidding agents and auctions can be organized hierarchically to implement an overall bidding plan. One skilled in the art would appreciate that many different embodiments of the bidding system can be used. For example, a monolithic bidding engine may receive auction events, review and analyze the bidding plan and current state of the auctions, and then place a bid accordingly.

Figure 9:
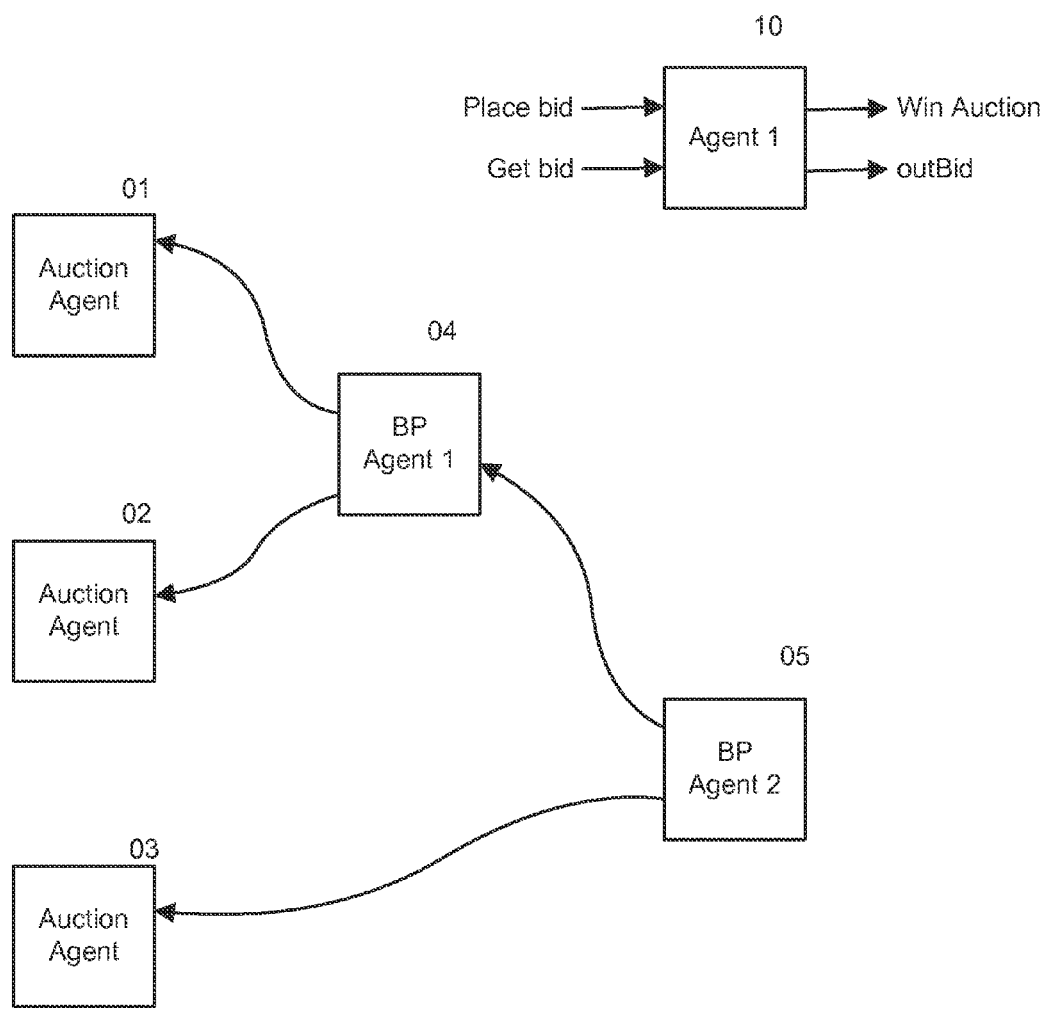
FIG. 9 is a block diagram illustrating the organization of a bidding plan that uses the best price bidding technique for three auctions.

FIG. 9 is a block diagram illustrating the organization of a bidding plan that uses the best price bidding technique for three auctions. This organization of agents is considered a bidding engine that implements the bidding plan. Block 910 illustrates the interface of an agent. An auction agent provides two notification events, outbid and win auction, and receives two message requests, place bid and get bid. Auction agents 901, 902, and 903 represent real auctions, and bidding agents 904 and 905 represent pseudo-auctions. These agents may be instances of C++-type objects. The bidding engine attempts to win one of those auctions at the lowest possible price. Bidding agent 904 implements a best price bidding technique for the auctions represented by auction agents 901 and 902. Bidding agent 905 implements a best price bidding technique for the pseudo-auction represented by bidding agent 904 and the real auction represented by auction agent 903. The bidding engine initially places the bid at the auction that has the current lowest price. To place this bid, bidding agent 905 requests the current bid from agents 903 and 904. When agent 904 receives the requests, it requests the current bids from auction agents 901 and 902 and responds to the request from agent 905 with an indication of the lower of the current bids. Agent 905 then requests to place a bid via agent 903 or agent 904, whichever has the lower current bid. For example, if agent 904 as the lower current bid, then it receives the request to place a bid at an auction. In response, agent 904 requests to place the bid via agent 901 or 902, whichever has the lower current bid. For example, if agent 901 has lower current bid, then it receives a request to place a bid and places the bid. When someone else places a higher bid at the auction represented by agent 901, then agent 901 notifies agent 904 by sending an outbid message. Agent 905 repeats the process of identifying whether the auctions represented by agent 903 or agent 904 has the lowest current bid and effects the placing of a bid at that auction. When an agent receives the win auction notification it notifies its parent agent, if any. (Agent 904 is the parent of agents 901 and 902.) When an agent requests a current bid, then an indication is returned indicating whether the maximum bid has been exceeded. If the bidding plan indicates that multiple auctions are to be won, for example, 2 out of 5, then each bidding agents needs to be provided with an indication of the number of auctions that it may win.

Figure 10:
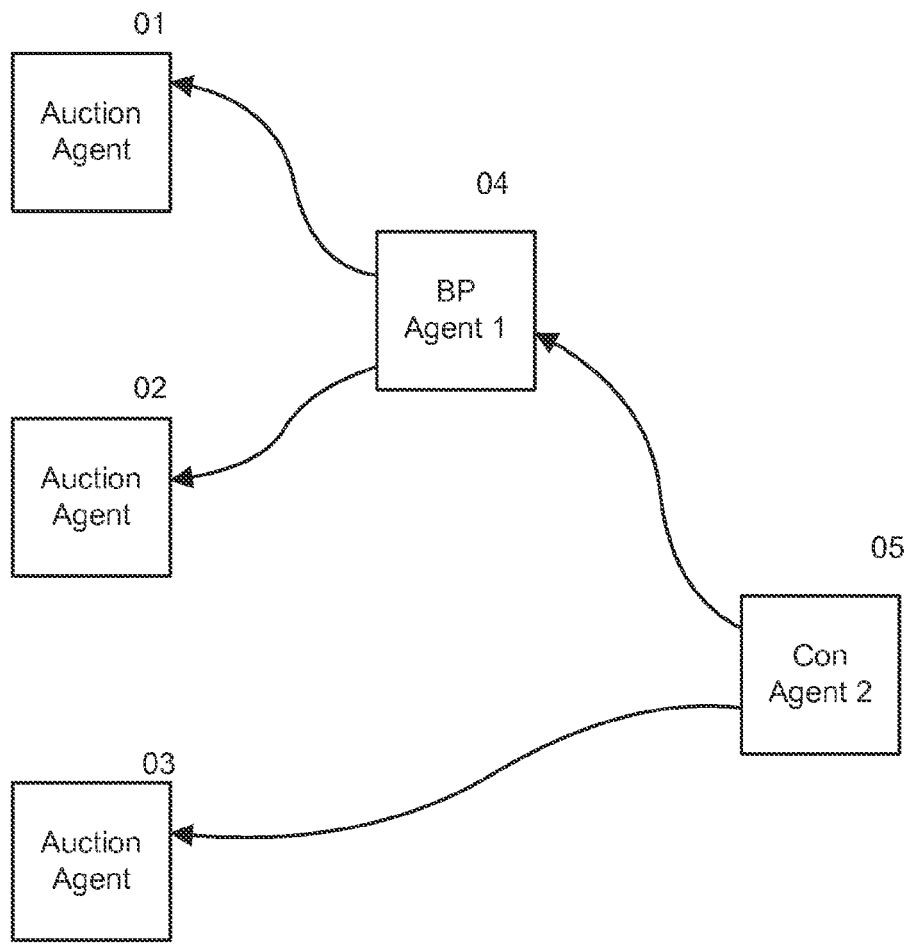
FIG. 10 is a block diagram illustrating the organization of a bidding plan that uses a combination of best price and contingent bidding techniques.

FIG. 10 is a block diagram illustrating the organization of a bidding plan that uses a combination of best price and contingent bidding techniques. The bidding technique uses a best price bidding technique with two auctions and uses a contingent bidding technique with a third auction. According to the bidding plan, a bid is placed at the third auction only if one of the two auctions is won. The organization of the bidding plan is similar to that of FIG. 9 except that agent 1005 implements a contingent bidding technique, rather than a best price bidding technique.

Figure 11:
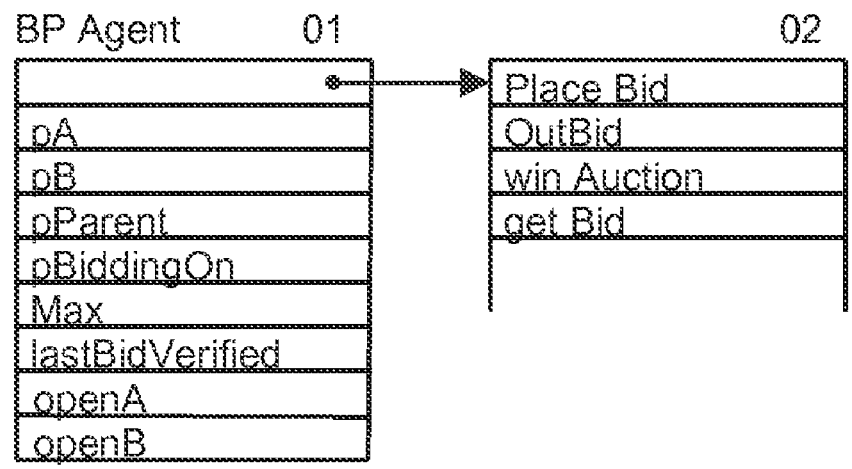
FIG. 11 is a block diagram illustrating an object representing a bidding agent.

FIG. 11 is a block diagram illustrating an object representing a bidding agent. In one embodiment, the object may correspond to a C++ object that includes data members and function members. Data structure 1101 contains pointers (pA and pB) to objects representing the real or pseudo-auctions controlled by this agent, a pointer (pParent) to the parent object representing a parent pseudo-auction, a pointer (pBiddingOn) to the agent through which a bid is pending at an auction, a maximum bid amount (max), a flag (lastBidVerified), and flags (openA and openB) indicating whether the controlled auctions are open. Function table 1102 contains pointers to functions that implement the behavior of the bidding agents. The functions include a place bid function, an outbid function, a win auction function, and a get bid function. The place bid function is invoked to place a bid at one of the two controlled auctions in accordance with the bidding technique implemented by the agent. The get bid function is invoked to retrieve the current bid at the pseudo-auction and returns an indication as to whether the auction is closed. The outbid function is invoked when the last bid by the agent has been outbid. The win auction function is invoked when the last bid is still pending and an auction ends.

Figure 12:
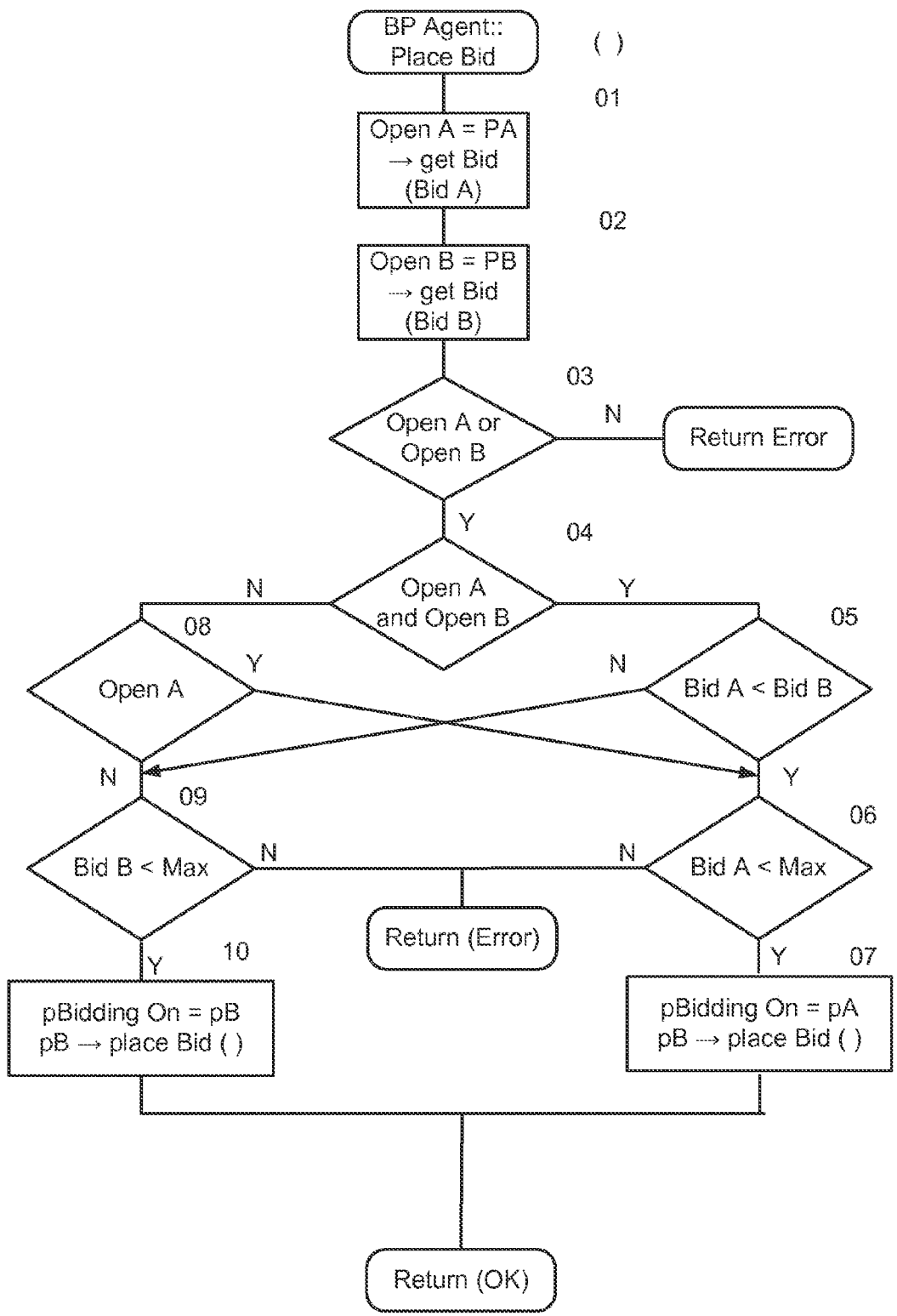
FIG. 12 is a flow diagram of a sample implementation of a place bid function.

FIGS. 12-15 are flow diagrams illustrating sample implementations of the functions of a bidding agent that implements the best price bidding technique. FIG. 12 is a flow diagram of a sample implementation of a place bid function. This function determines which of the two controlled auctions (A or B) has the lower current bid and places a bid at that auction. In block 1201, the function retrieves the current bid of auction A. In block 1202, the function retrieves the current bid of auction B. In decision block 1203, if auction A or B is open, then the function continues at block 1204, else the function returns an error. In decision block 1204, if auctions A and B are open, then the function needs to identify the auction with the lower bid and continues at a block 1205, else the function continues at block 1208. In decision block 1205, if the current bid for auction A is less than the current bid for auction B, then the function continues at block 1206, else the function continues the block 1209. In decision block 1206, auction A has the lower bid and if the current bid for auction A is less than the maximum bid, then the function continues at block 1207, else the function returns an error. In block 1207, the function indicates that the agent is currently bidding at auction A and places a bid at auction A by invoking the place bid function of auction A and then returns. In decision block 1208, if only auction A is open, then the function continues at block 1206, else only auction B is open and the function continues at block 1209. In decision block 1209, auction B has the lower bid and if the current bid for auction B is less than the maximum bid, then the function continues at block 1210, else the function returns an error. In block 1210, the function indicates that the agent is currently bidding at auction B and places a bid at auction B and then returns.

Figure 13:
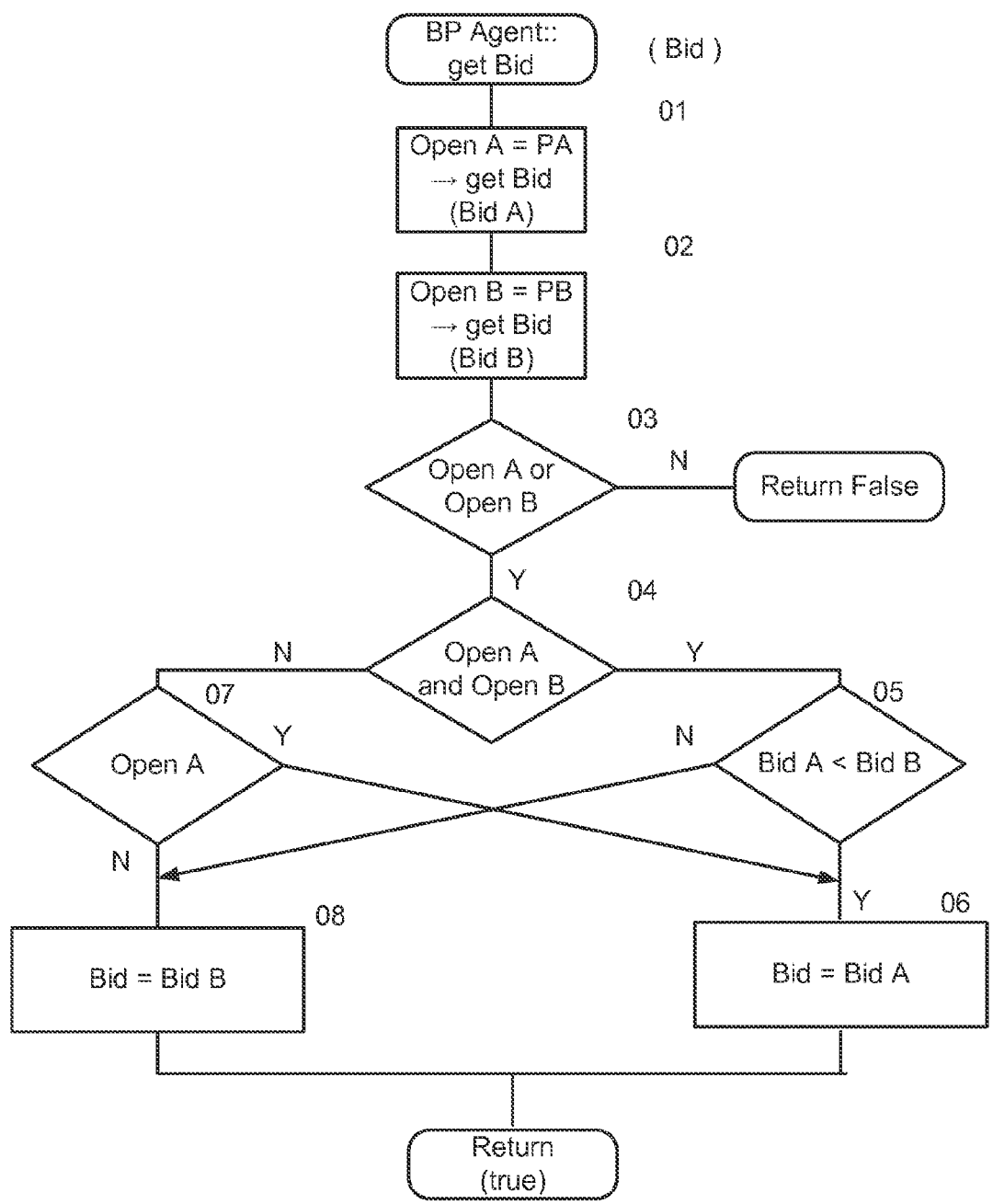
FIG. 13 is a flow diagram of the sample implementation of a get bid function.

FIG. 13 is a flow diagram of the sample implementation of a get bid function. This function returns the lower current bid of the two controlled auctions. In block 1301, the function retrieves the current bid of auction A. In block 1302, the function retrieves current bid of auction B. In decision block 1303, if auction A or B is open, then the function continues at block 1304, else the function returns an error. In decision block 1304, if auctions A and B are open, then the function continues at block 1305, else the function continues at block 1307. In decision block 1305, if the current bid at auction A is less than the current bid at auction B, then the function continues at block 1306, else the function continues at block 1308. In block 1306, the function sets the bid to return to the current bid of auction A and then returns. In decision block 1307, if only auction A is open, then the function continues at block 1206, else only auction B is open the function continues at block 1308. In block 1308, the function sets the bid to return to the current bid of auction B and then returns.

Figure 14:
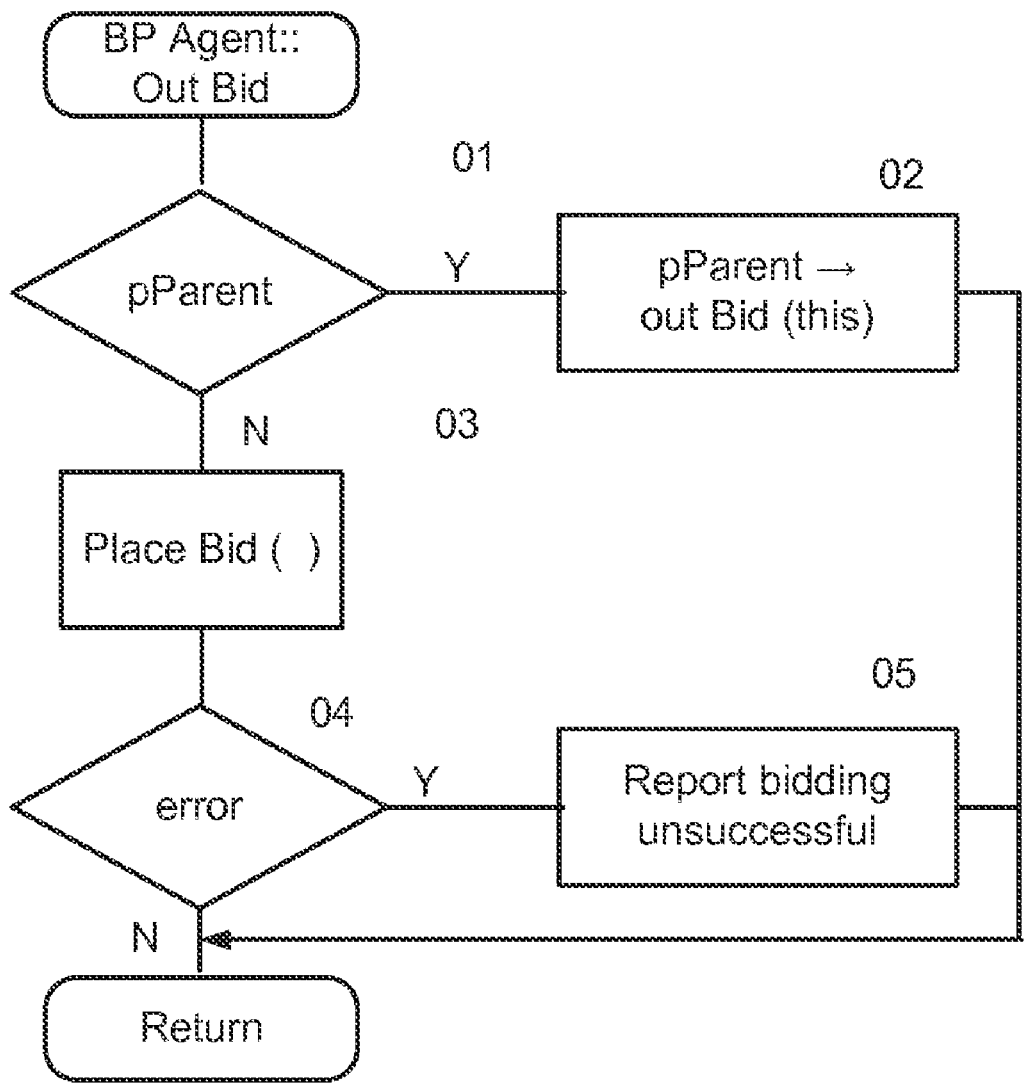
FIG. 14 is a flow diagram of a sample implementation of an outbid function.

FIG. 14 is a flow diagram of a sample implementation of an outbid function. This function is invoked by an agent of a controlled (child) auction whenever the last bid of an agent is outbid. In decision block 1401, if the agent has a parent, then the function continues at block 1402, else the function continues at block 1403. In block 1402, the function invokes the outbid function of the parent and the returns. In block 1403, the function invokes the place bid function of this agent which decides whether to place another bid at the controlled auctions. In decision block 1404, if there was an error in placing a bid, then the auctions may be closed or the maximum bids exceeded and the functions continues at block 1405, else the function returns. In block 1405, the function reports that the bidding was unsuccessful and then returns.

Figure 15:
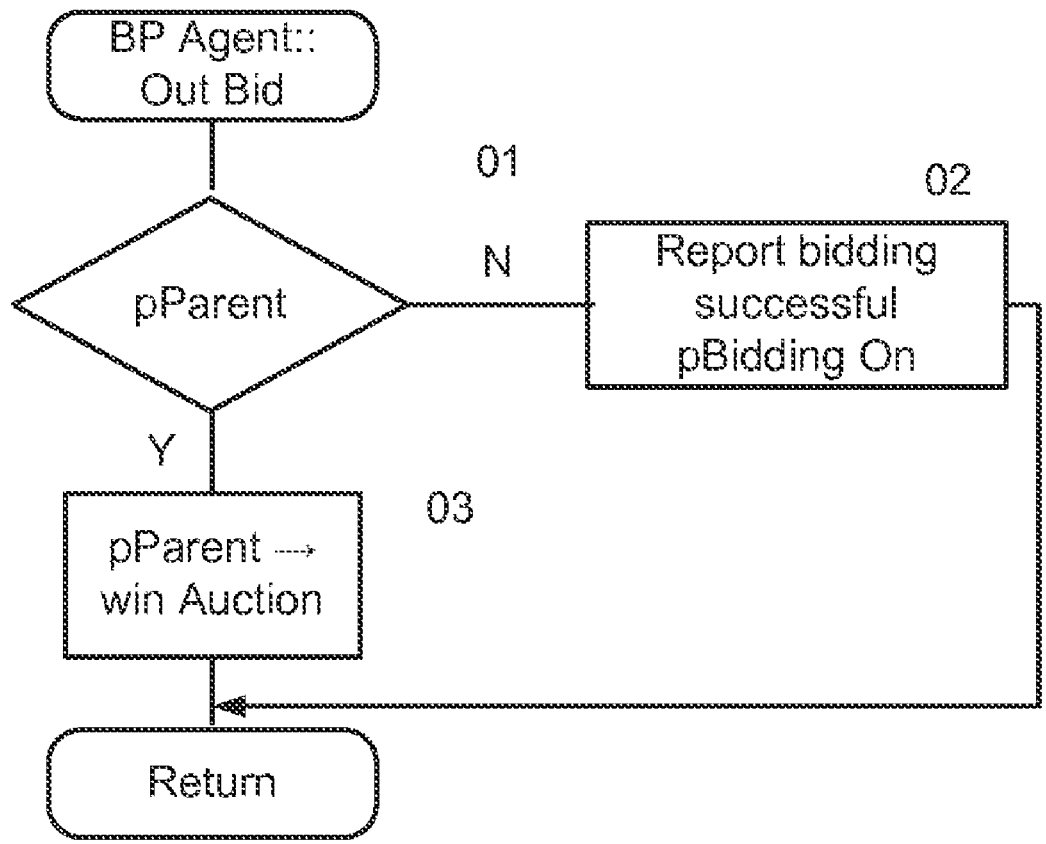
FIG. 15 is a flow diagram of a sample implementation of a win auction function.

FIG. 15 is a flow diagram of a sample implementation of a win auction function. This function is invoked by an agent of a controlled auction when the auction ends and the winning bid was placed by the agent. In decision block 1501, if the agent has a parent, then the function continues at block 1503, else the function continues at block 1502. In block 1502, the function reports that the bidding has been successful and performs any necessary clean up and then returns. In block 1503, the function notifies the parent that the auction has been won and then returns.

From the foregoing, it will be appreciated that although specific embodiments of the invention have been described herein for purposes of illustration, various modifications may be made without deviating from the spirit and scope of the invention. For example, the bidding agents could directly control more than two auctions, and the hierarchy could be based on bidding type (e.g., best price or contingent.). Accordingly, the invention is not limited except by the appended claims.

I claim:

1. A method performed by a computer system for bidding on auctions, the method comprising:
   receiving at the computer system an indication of a plurality of auctions, including one or more contingent-on auctions and one or more contingent auctions;
   receiving at the computer system an indication of a bidding technique to apply to the indicated auctions; and
   participating in some of the indicated auctions at the computer system in accordance with the indicated bidding technique, the bidding technique further comprising placing a bid for a bidder in at least one of the contingent-on auctions, and placing a bid for the bidder in at least one of the contingent auctions only when the at least one of the contingent-on auctions has been won by the bidder.

2. The method of claim 1, wherein receiving an indication of a plurality of auctions further comprises receiving from a bidder an identifier of the one or more contingent-on auctions and an identifier of the one or more contingent auctions.

3. The method of claim 1, wherein receiving an indication of a plurality of auctions further comprises receiving from a bidder a maximum bid for the one or more contingent-on auctions and a maximum bid for the one or more contingent auctions.

4. The method of claim 1, wherein placing a bid in at least one of the contingent-on auctions comprises placing a bid in at least two contingent-on auctions.

5. The method of claim 1, wherein placing a bid in at least one of the contingent auctions comprises placing a bid in at least two contingent auctions.

6. The method of claim 1, wherein placing a bid in at least one of the contingent-on auctions comprises placing a bid in at least two contingent-on auctions, and wherein placing a bid in at least one of the contingent auctions comprises placing a bid in at least two contingent auctions only when the at least two contingent-on auctions has been won.

7. The method of claim 1, wherein the bidding technique includes initially bidding in the at least one of the contingent-on auctions for the bidder and, responsive to the at least one of the contingent-on auctions being won by the bidder, starting bidding in the at least one of the contingent auctions.

8. The method of claim 1, wherein the bidding technique includes initially bidding in the at least one of the contingent-on auctions for the bidder and, responsive to a maximum bid of the bidder for the contingent-on auctions being exceeded, stopping bidding and not bidding on the at least one of the contingent auctions.

9. The method of claim 1, wherein the bidding technique includes initially bidding in the at least one of the contingent-on auctions for the bidder and, responsive to the at least one of the contingent-on auctions not yet being won by the bidder, continuing bidding on the at least one of the contingent-on auctions until the bidder wins the at least one of the contingent-on auctions or a maximum bid of the bidder is exceeded.

10. The method of claim 1, wherein the bidding technique further includes placement of a bid in at least two of the contingent-on auctions so that multiple bids are pending simultaneously, and placement of a bid in another of the contingent-on auctions having a lowest current bid whenever being outbid.

11. The method of claim 1, wherein the bidding technique further includes bidding in at least two contingent-on auctions, the bidding being performed in these auctions according to an order of preference of the auctions provided by a bidder.

12. A computer system for bidding on auctions, the system comprising:
   a processor;
   a bidding plan storage device;
   a define bid component that receives a bidding plan that specifies to bid at a plurality of auctions, including one or more contingent-on auctions and one or more contingent auctions, and that stores the received bidding plan in the bidding plan storage device; and
   a bidding engine that retrieves the bidding plan from the storage device and places bids at auctions in accordance with the bidding plan, the bidding plan further specifying to bid for a bidder in at least one of the contingent auctions only when at least one of the contingent-on auctions has been won by the bidder.

13. The computer system of claim 12, wherein the bidding plan comprises placing a bid on at least two contingent-on auctions.

14. The computer system of claim 12, wherein the bidding plan comprises placing a bid on at least two contingent auctions only when the at least one of the contingent-on auctions has been won.

15. The computer system of claim 12, wherein the bidding plan includes an identifier of the one or more contingent-on auctions and the one or more contingent auctions and a maximum bid for the one or more contingent-on auctions and the one or more contingent auctions.

16. The computer system of claim 12, wherein the bidding plan includes initially bidding on the at least one of the contingent-on auctions and, responsive to the maximum bid being exceeded, stopping bidding and not bidding on the at least one of the contingent auctions.

17. The computer system of claim 12, wherein the bidding plan comprises a contingent bidding technique, and wherein the bidding plan also comprises either a best-price bidding technique or a preferred auction bidding technique.

18. A non-transitory computer-readable storage medium containing instructions for controlling a computer system to bid at auctions by a method comprising:
   receiving at the computer system an indication of a plurality of auctions, including one or more contingent-on auctions and one or more contingent auctions;
   receiving at the computer system an indication of a bidding technique to apply to the indicated auctions; and
   participating in some of the indicated auctions at the computer system in accordance with the indicated bidding technique, the bidding technique further comprising placing a bid for a bidder in at least one of the contingent-on auctions, and placing a bid for the bidder in at least one of the contingent auctions only when the at least one of the contingent-on auctions has been won by the bidder.

19. The computer-readable storage medium of claim 18, wherein placing a bid in at least one of the contingent-on auctions comprises placing a bid in at least two contingent-on auctions, and wherein placing a bid at least one of the contingent auctions comprises placing a bid in at least two contingent auctions only when the at least two contingent-on auctions has been won by the bidder.

20. The computer-readable storage medium of claim 18, wherein the bidding technique further comprises a combination of placing a bid at an auction with a lowest current bid whenever being outbid and bidding in auctions according to an order of preference of a bidder.

21. The computer-readable storage medium of claim 18, wherein the bidding technique comprises bidding at multiple auctions so that multiple bids are pending simultaneously.

22. The computer-readable storage medium of claim 18, wherein the bidding technique further comprises evaluating auctions for similar items and placing a bid in the at least one of the contingent-on auctions or the at least one of the contingent auctions with a lowest current bid whenever a last bid is outbid.

* * * * *